(12) United States Patent
Venable

(10) Patent No.: US 6,480,626 B1
(45) Date of Patent: Nov. 12, 2002

(54) SYSTEM AND METHOD FOR RAPIDLY ACCESSING IMAGE INFORMATION USING SEGMENTATION TAGS

(75) Inventor: Dennis Lee Venable, Marion, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/159,623

(22) Filed: Sep. 24, 1998

(51) Int. Cl.[7] .................................................. G06K 9/34
(52) U.S. Cl. ........................ 382/180; 382/173; 382/232
(58) Field of Search ................................. 382/173, 180, 382/232, 176; 358/467, 426

(56) References Cited

U.S. PATENT DOCUMENTS

| | | | | | |
|---|---|---|---|---|---|
| 4,718,101 A | * | 1/1988 | Ariga et al. | ................. | 382/180 |
| 5,699,453 A | * | 12/1997 | Ozaki | ......................... | 382/176 |
| 5,933,249 A | * | 8/1999 | Shimura et al. | ............ | 358/429 |
| 5,966,468 A | * | 10/1999 | Fujimoto | ..................... | 382/239 |

* cited by examiner

*Primary Examiner*—Thomas D. Lee
(74) *Attorney, Agent, or Firm*—Oliff & Berridge, PLC

(57) ABSTRACT

Segmentation tags are associated with image data. The segmentation tags of the image data are accessed using only a lookup table, which is created using information from the header of the image, and bit operations.

22 Claims, 9 Drawing Sheets

000
SYSTEM AND METHOD FOR RAPIDLY ACCESSING IMAGE INFORMATION USING SEGMENTATION TAGS

BACKGROUND OF THE INVENTION

1. Field of Invention

This invention relates to accessing image information. More particularly, this invention is directed to a system and method for accessing image information by efficiently processing segmentation tags.

2. Description of Related Art

In many current image processing applications, such as digital copying and the like, it is desirable to store image information about the image, in addition to the actual image data that defines the image, on a pixel-by-pixel basis. For example, a single image may contain various types of image data, such as text data, picture data in the form of sampled image data, continuous tone data and/or halftone data, graphics data, such as line art data and the like, and/or background data. It is often useful to store information identifying the data type of the image data for each pixel.

For example, in compressing the image data of such an image, it is often desirable to process the different types of image data using different compression techniques. Background data and continuous tone (contone) image portions that are formed by sampled data, continuous tone data and/or halftone data, for example, do not normally need to be compressed with the same degree of precision as text or line art data. Therefore, a lossy compression technique may be used to process the less loss-critical data, such as the continuous tone or background data, while a lossless compression technique may be used for the text data or line art data.

Accordingly, each pixel of the image is assigned one or more segmentation tags, where each tag identifies a certain type of information about the image data of that pixel. These segmentation tags can be used to represent a segmented image, where all pixels sharing a common set of tag values may be considered a single object.

SUMMARY OF THE INVENTION

In prior methods of accessing tag information, all users using tag information had to agree in advance upon what each tag would mean. Reaching such an agreement was logistically problematic, especially when a large number of users were involved. Moreover, even after a set of tags was successfully established, individual users could not freely add new tags as new tags became necessary. Furthermore, procedure calls were typically required to access the segmentation tags of each pixel of an image, resulting in a great deal of tedium in programming and reduced efficiency in accessing the segmentation tags.

Accordingly, in order to obtain maximum benefit of segmentation tags, a system and method for quickly and efficiently accessing tag information is desirable so that image processing apparatus can quickly process and/or reproduce image data, and so that software developers and/or technicians who program the image processing apparatus can do so quickly and efficiently.

This invention provides a system and method for quickly and efficiently processing segmentation tags using lookup tables and bit operations.

In one aspect of the invention, families of segmentation tags are defined so that each pixel of an image may be associated with more than one segmentation tag.

In another aspect of the invention, a lookup table is automatically created based on information contained within header information of an image, and the segmentation tags are accessed using the lookup table and bit operations.

In certain embodiments, the set of allowed tags and/or tag encoding information may be read directly from the image header of the image. In other embodiments, the set of allowed tags and/or the tag encoding information may be read from a separate file.

In another aspect of the invention, a software developer's tool kit is provided that includes a library that initializes table lookups based on information indicating a set of allowed tags and information indicating how tags are encoded within an image. The library defines at least one macro that provides access to tag information by performing table lookups and bit operations. Using this tool kit, a software developer can easily and quickly access desired tag information while developing software for a digital image output device.

In yet another aspect of the invention, a digital image processing device is provided that includes a segmenter that segments an image by analyzing received image data, associating at least one segmentation tag (which may be a "NO TAG" tag) with each pixel of the image data, generating header information and associating the header information with the received image data, and storing the image data along with the segmentation tags and header information. The digital image processing device also includes apparatus capable of performing a minimal set of bit operations, including bit shifts, bits masks and table lookups, and an access library that obtains information indicating the set of allowed segmentation tags and information indicating how the segmentation tags are coded. The access library creates a lookup table based on the obtained segmentation tag information. The digital image processing device accesses at least a portion of the segmentation tag information using the lookup table and the minimal set of bit operations and processes the image data in accordance with the accessed tag information. The digital image processing device further includes an image file sink to which the processed data is output.

These and other features and advantages of this invention are described in or are apparent from the following detailed description of preferred embodiments.

BRIEF DESCRIPTION OF THE DRAWINGS

Preferred embodiments of this invention will be described in detail, with reference to the following figures, in which.

DETAILED DESCRIPTION OF PREFERRED EMBODIMENTS

Figure 1:
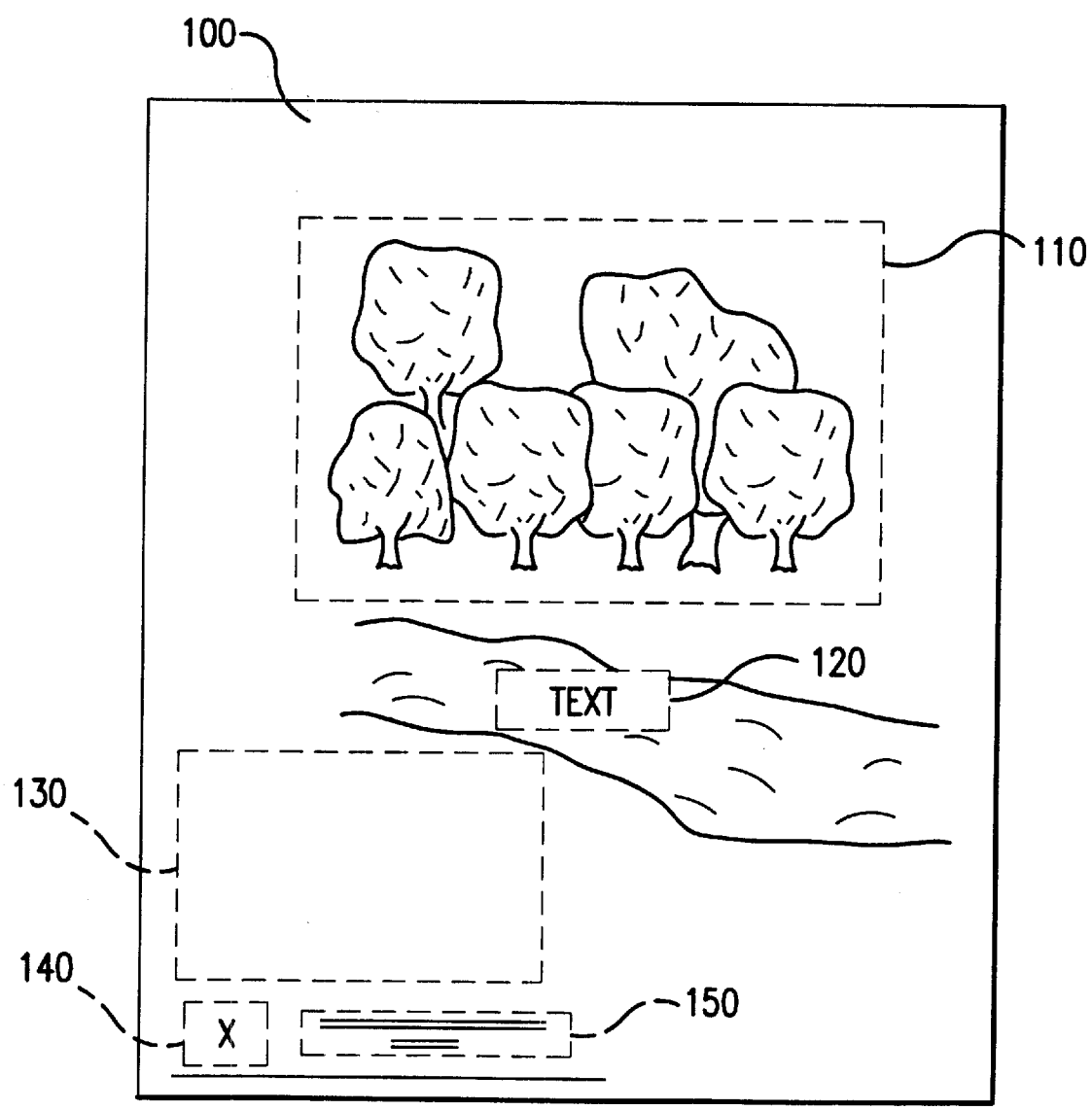
FIG. 1 shows an example of an image containing various types of image data.

FIG. 1 shows an example of an image 100 that includes several areas 110–150 that have different types of image data. The area 110 contains picture data, such as sampled image data, continuous tone data and/or halftone data. The areas 120 and 150 contain text data. The area 130 contains background data. The area 140 contains special graphic data, such as line art data. The special graphic data in area 140 is the Xerox logo, which is a unique representation of the letter "X" that is colored a specific shade of red, designated as "XeroxRed". In the graphics area 140, as in the text areas 120 and 150, maintaining the edges is critical, while maintaining a large number of colors is not critical. In contrast, in the picture data area 110, maintaining a sufficient number of colors is critical, while maintaining any edges appearing in the picture data area 110 is not as critical.

Information relating to each pixel of an image may be stored in a memory, such as, for example, in a recording medium, and arranged in information channels. "Channels" as referred to herein need not connote discrete physical structures, but may refer to the functional way in which information is stored. Typically, information channels are provided for at least color information relating to the pixels of the image. Additional channels may also be provided as needed to store additional information, such as segmentation tag information, as will be described below. The information channels in which tag information is stored will, for convenience, be referred to hereafter as omega channels.

According to this invention, specific segmentation tags are defined in tag families. Each pixel within the image is tagged with at least one segmentation tag.

Each pixel may be tagged with tags from more than one family, but may have no more than one tag from each allowed tag family. This tag information is stored in the omega channels. The allowed tag families may include, for example, FUNCTION, EDGE, COLOR, HALFTONE and TRC (Tone Reproduction Curve) families. Table 1 lists examples of possible tag families, along with examples of individual tags within each tag family. An exemplary maximum number of tags in each tag family is also listed.

TABLE 1

| Tag Family | Tags | Max. No. of Tags |
|---|---|---|
| FUNCTION | "Picture", "Background", "Text", "LineArt", . . . | 8 |
| EDGE | "Yes" | 2 |
| COLOR | "Black", "White", "XeroxRed", "KodakYellow", . . . | 64 |
| HALFTONE | "ED", "LoFreq", "HiFreq" | 4 |
| TRC | "TRC1", "TRC2", "TRC3", . . . | 8 |

It should be appreciated that one of the possible tags in each family is a "NO TAG" tag. The "NO TAG" tag indicates that no specific segmentation information has been provided for the pixel for that tag family. If the "NO TAG" tag is implemented, then there will be $2^n-1$ substantive tags in each family, where n is the number of bits allocated for each tag family in the data structure described below with respect to FIG. 2.

As stated above, each pixel may have no more than one tag per allowed tag family. For example, a pixel cannot be both "Picture" and "Text", or both "Black" and "Red".

For each image, information about how the segmentation tags are encoded may be stored in the header information of the image. The set of allowed tags may also be contained within the image header information. Alternatively, the tag encoding information and/or the set of allowed tags may be read from a separate file or files.

An access library is provided, for example, by being stored in a memory, such as, for example, a suitable storage medium, such as a magnetic or optical storage medium, which may be part of a computer memory or a separate disk read using a suitable disk drive. In certain embodiments, the library constructs bit descriptors, or integer representations, of the allowed tags for the image.

Figure 2:
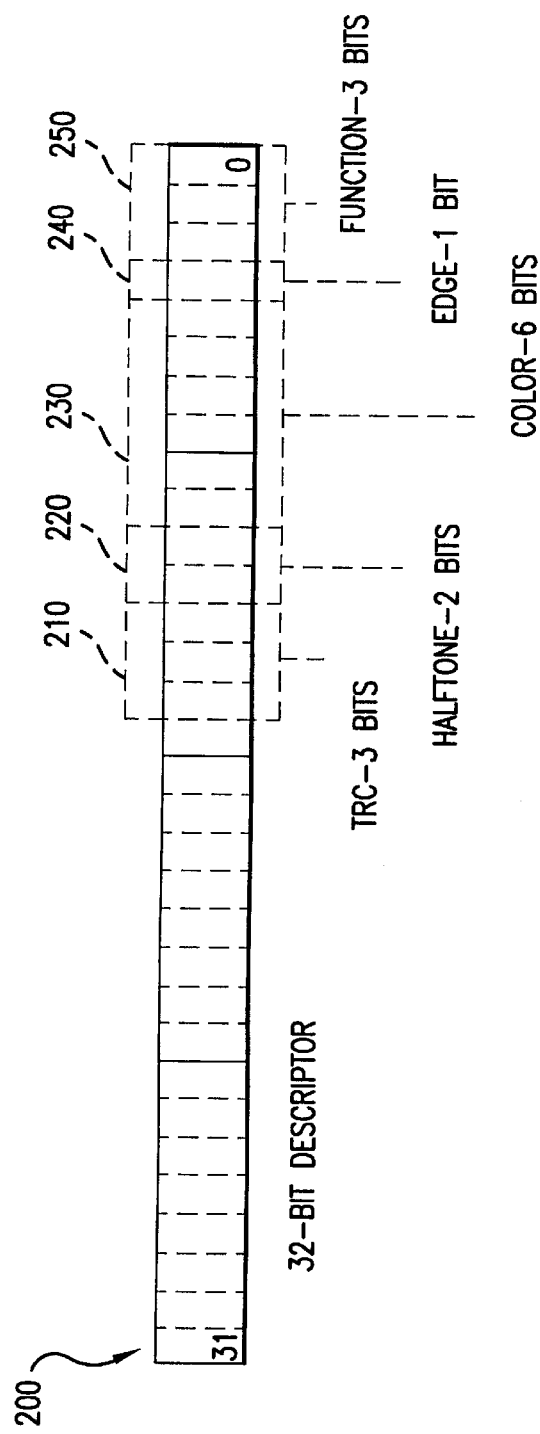
FIG. 2 shows an example of a data structure representing the allowed tags according to certain embodiments of this invention.

FIG. 2 shows the configuration of an exemplary 32-bit descriptor, or more generally, data structure, 200. In the data structure 200, 3 bits are allocated for the FUNCTION tags, for a total of $2^3=8$ possible values. The EDGE tag can only be "Yes" or "No", so only 1 bit is allocated for the EDGE tag. 6 bits are allocated for the COLOR tags, for a total of $2^6=64$ possible values. Similarly, 2 bits are needed for the 3 possible HALFTONE tags, and 3 bits are allocated for the 7 possible TRC (Tone Reproduction Curve) tags.

Since the allowed tags in this example require a total of 15 bit positions, two 8-bit-wide samples, or channels, are used if all the allowed tags are to be used in a particular application. Any application that does not need all of the allowed tags may not need the maximum number of channels. For example, if the allowed tags that are actually to be used in a given application only require 8 bits or less, only one channel would need to be used.

If 16-bit-wide or wider samples are used, only one such sample would be needed when the allowed tags require a total of 15 bit positions, as in this example.

Figure 3:
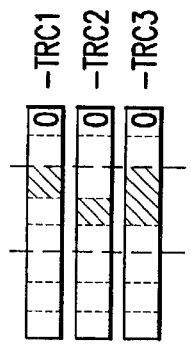
FIG. 3 shows the data configuration of tag data in a representative sample, or channel.

FIG. 3 shows the data configuration of data in a representative sample, or channel.

In creating the lookup tables, the information describing how the tags are encoded within a given image is obtained from the header information of the image or from an external source, such as a separate file. For convenience, the following description assumes the case in which the tag encoding information is obtained from the header information. For example, one set of exemplary header entries is:

[OmegaSegmentation]

ch0.bit2-4.val1: TRC.TRC1 ch0.bit2-4.val2: TRC.TRC2 ch0.bit2-4.val3: TRC.TRC3.

The header entries show that if bits 2–4 of an 8-bit-wide sample from a first channel, called channel 0, have a binary value of 1, as shown by the first element in FIG. 3, then the tag TRC.TRC 1 is indicated. If bits 2–4 have a binary value of 2, as shown by the second element in FIG. 3, then the tag TRC.TRC2 is indicated. If bits 2–4 have a binary value of 3, as shown by the third element in FIG. 3, then the tag TRC.TRC3 is indicated.

In FIG. 3, bits 0–1 and 5–7 are empty, but this is only for purposes of illustration. These bits can be encoded with tags from other families, such as shown in FIG. 2. Accordingly, in this embodiment, only two channels are needed for the five tag families if all tag families are required in a given application. As described above, only one channel may be needed if not all the tag families are used.

Figure 4:
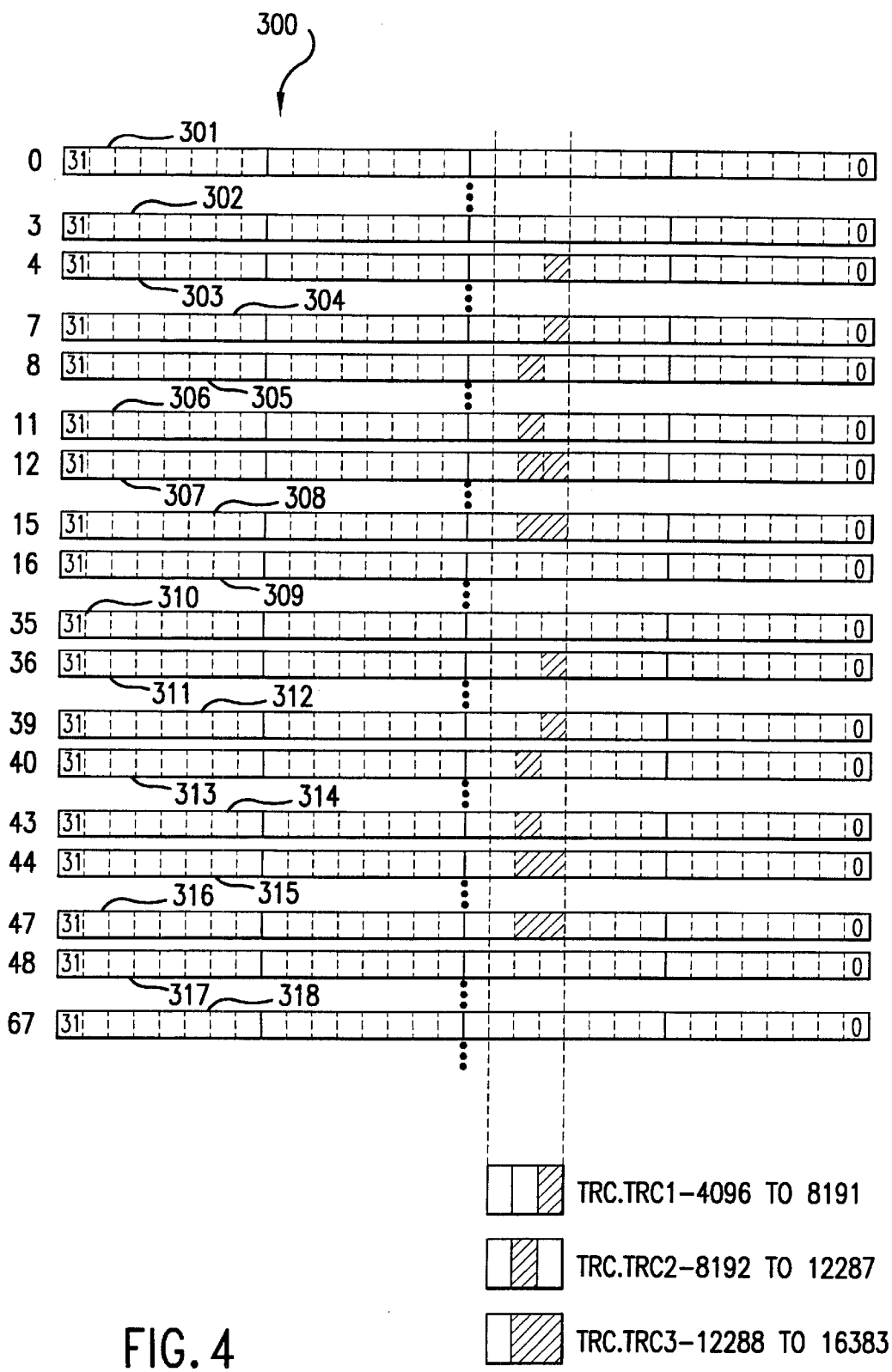
FIG. 4 shows a portion of an exemplary lookup table created according to this invention.

FIG. 4 shows selected entries 301–318 of an exemplary lookup table 300. Lookup tables are created from the data structures. In this embodiment, one lookup table is created for each channel used for the segmentation tags. For example, with the 8-bit-wide samples described above, two lookup tables are created. If wider samples were used, fewer lookup tables would be required. For example, if 16-bit-wide samples were used, only one lookup table would be required.

Information in the header or a separate file defines a value of each tag in the lookup table 300. For example, the TRC.TRC 1 tag is defined to have the binary value of 4096 in a 32-bit descriptor, as shown by entries 303, 304, 311 and 312 of the lookup table 300. Similarly, the TRC.TRC2 tag is defined to have the binary value of 8192, as shown by entries 305, 306, 313 and 314, and the TRC.TRC3 tag is defined to have the binary value of 12288, as shown by entries 307, 308, 315 and 316.

In each 8-bit-wide sample, there are $2^8$=256 possible sample values. Therefore, 256-entry lookup tables are created for each tag specified in the image header. As the 256-entry lookup table is created, the appropriate 32-bit descriptors corresponding to the various tags are written into the table. How tags are encoded in the samples defines which elements of the descriptor have a particular tag. For example, for the tag TRC.TRC1, the above-mentioned bit value 4096 is written into the 32-bit descriptor stored in the table for the table entries 4–7 and 36–39. For the tag TRC.TRC2, the bit value 8192 is written into the 32-bit descriptor stored in the table for the table entries 8–11 and 40–43. For the tag TRC.TRC3, the bit value 12288 is written into the 32-bit descriptor stored in the table for the table entries 12–15 and 44–47.

In this embodiment, since there are 81 possible tags (from the 7 tags in the FUNCTION tag family, 1 tag in the EDGE tag family, 63 tags in the COLOR tag family, 3 tags in the HALFTONE tag family, and 7 tags in the TRC tag family), up to 81×256=20,736 different writing operations may be necessary to create the lookup tables.

Alternatively, a fewer number of writing operations may be executed to create a lookup table when the desired number of tag families is less than the total number of allowed tags. For example, if a user is interested solely in one or a few tag families and will not need to use the access library to access other tag families, a lookup table may be created for just the desired tag families.

The above-described process for creating lookup tables preferably occurs automatically at initialization, but may occur at any time before the lookup table or tables are actually needed for accessing the segmentation tag information.

After the lookup tables are created, the tag information of an image may be accessed using the lookup tables and bit operations.

Figure 5:
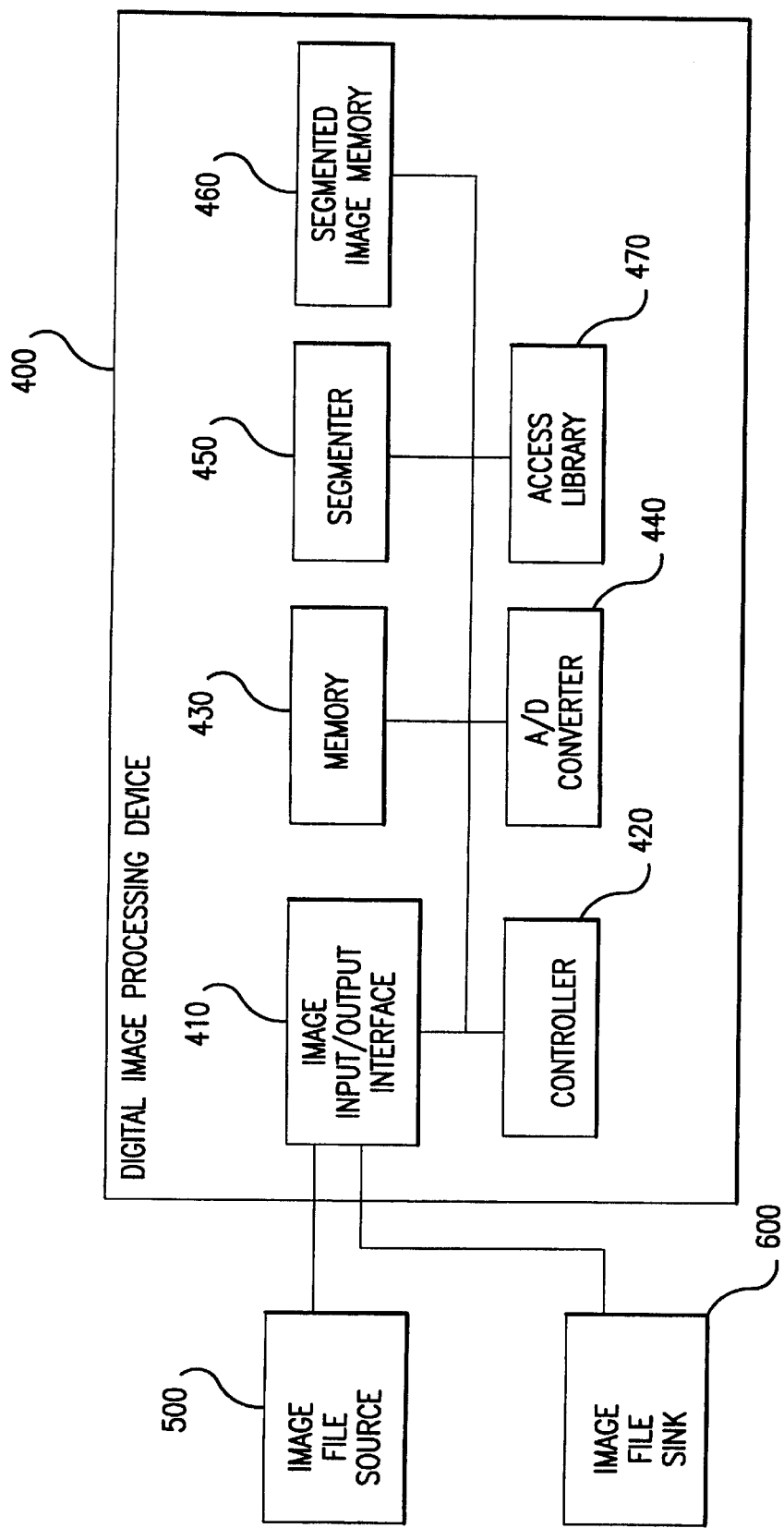
FIG. 5 is a functional block diagram of a digital image processing device according to this invention.

As shown in FIG. 5, a digital image processing device 400 includes an image input/output interface 410, a controller 420, a memory 430, an A/D converter 440, a segmenter 450, a segmented image memory 460, and an access library 470, and are interconnected by a data/control bus 405. An external image file source 500 and an external image file sink 600 are connected to the image input/output interface 410 of the digital signal processing device 400.

The memory 430 and the segmented image memory 460 are preferably implemented using static or dynamic RAM. However, the memory 430 and the segmented image memory 460 can also be implemented using a floppy disk and disk drive, a writable optical disk and disk drive, a hard drive, flash memory or the like.

Furthermore, it should be appreciated that memory 430 and the segmented image memory 460 need not be physically distinct memories. For example, the segmented image memory 460 may be a part of the memory 430.

It should also be appreciated that the image file source 500 may be any device or system capable of producing or transmitting image information. For example, the image file source 500 may be a scanner, a data carrier such as a magnetic storage disk, CD-ROM or the like, or a host computer. The image file sink 600 may be a printer, a facsimile machine, a digital copier memory, a CRT or LCD display, a host computer, a remotely located computer, or the like. Further, it should be appreciated that the source 500 and/or sink 600 may be connected to the digital image processing device 400 directly, as dedicated devices, or may be connected by a network (not shown). The network can be a local area network, a wide area network, an intranet, the Internet, or any other distributed processing storage network.

The digital image processing device 400 determines whether incoming data is digital data or analog data. If the incoming data is analog data, the incoming data is transmitted by the controller from the image input/output interface 410 or the memory 430 or 460 to the A/D converter 440. The A/D converter 440, under control of the controller 420, converts the incoming data into digital data. The digital data, under control of the controller 420, can then be stored in the memory 430 or 460. The digital data is input under control of the controller 420 from the A/D converter 440 or the memory 430 or 460 to the segmenter 450. The segmenter 450, under control of the controller 420, converts digital image data into segmented image data. The segmented image memory 460 stores the segmented image data. The access library 470, under the control of the controller 420, is used to access the segmented image data in a desired manner.

In general, in the digital image processing device 400 shown in FIG. 5, image information is input from the image file source 500 via the image input/output interface 410 in the form of analog or digital image data. The image data may be stored in the memory 430 before and/or after being further processed.

If the incoming image data is not already digital data, it is converted to digital data by the A/D converter 440. Under the control of the controller 420, the segmenter 450 segments the image data into segmented image data, in a process which will be described in detail hereafter.

The segmented image data may be stored temporarily in the segmented image memory 460 before being accessed by the access library 470. Alternatively, the segmented image information can be transmitted directly to the access library 470.

Within the digital image processing device 400, all storing, segmenting and accessing of the image data is performed under the control of the controller 420. It should be appreciated that the controller 420 may comprise any number of components and/or functions, and need not be physically located in a single location within the digital image processing device 400.

After being accessed and processed by the access library 470, the information may be stored in the memory 430 or any other storage medium for later retrieval, or may be transmitted directly to the image file sink 600.

Figure 6:
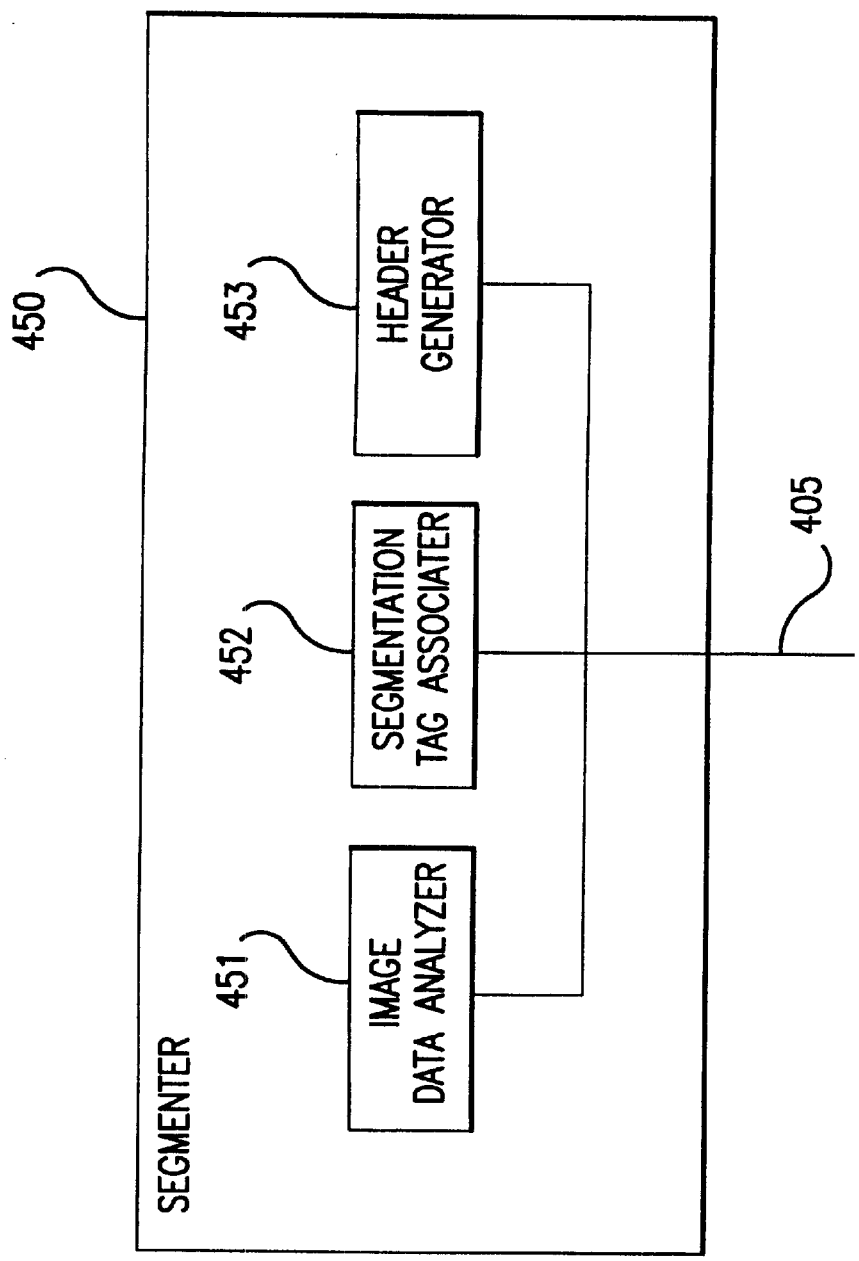
FIG. 6 is a functional block diagram of a segmenter according to this invention.

The segmenter 450 is shown in greater detail in FIG. 6. The segmenter 450 includes an image data analyzer 451, a segmentation tag associater 452, and a header generator 453. The image data analyzer 451 digital image data to determine what type of data it is. The segmentation tag associater 452 associates at least one segmentation tag with each pixel of the image data. The header generator 453 generates a header containing information about the image, which may include information about how the segmentation tags have been encoded within the image data and/or the set of allowed tags. The header generator 453 associates this header with the digital image data.

As shown in FIG. 6, when digital data enters the segmenter 450, the header generator 453 generates a header that contains information relating to the digital image data, and associates the header with the digital image data. The image data analyzer 451 analyzes the digital image data, pixel-by-pixel, and determines what type of information is contained within each pixel.

Based upon the analysis made by the image data analyzer 451 for each pixel, the segmentation tag associater 452 associates one or more segmentation tags with each pixel. In other words, the segmentation tag associater "embeds" segmentation tags into the digital image.

After the segmentation tags are associated with each pixel, the image data is transmitted to the segmented image memory 460 or is accessed directly by the access library 470.

Figure 7:
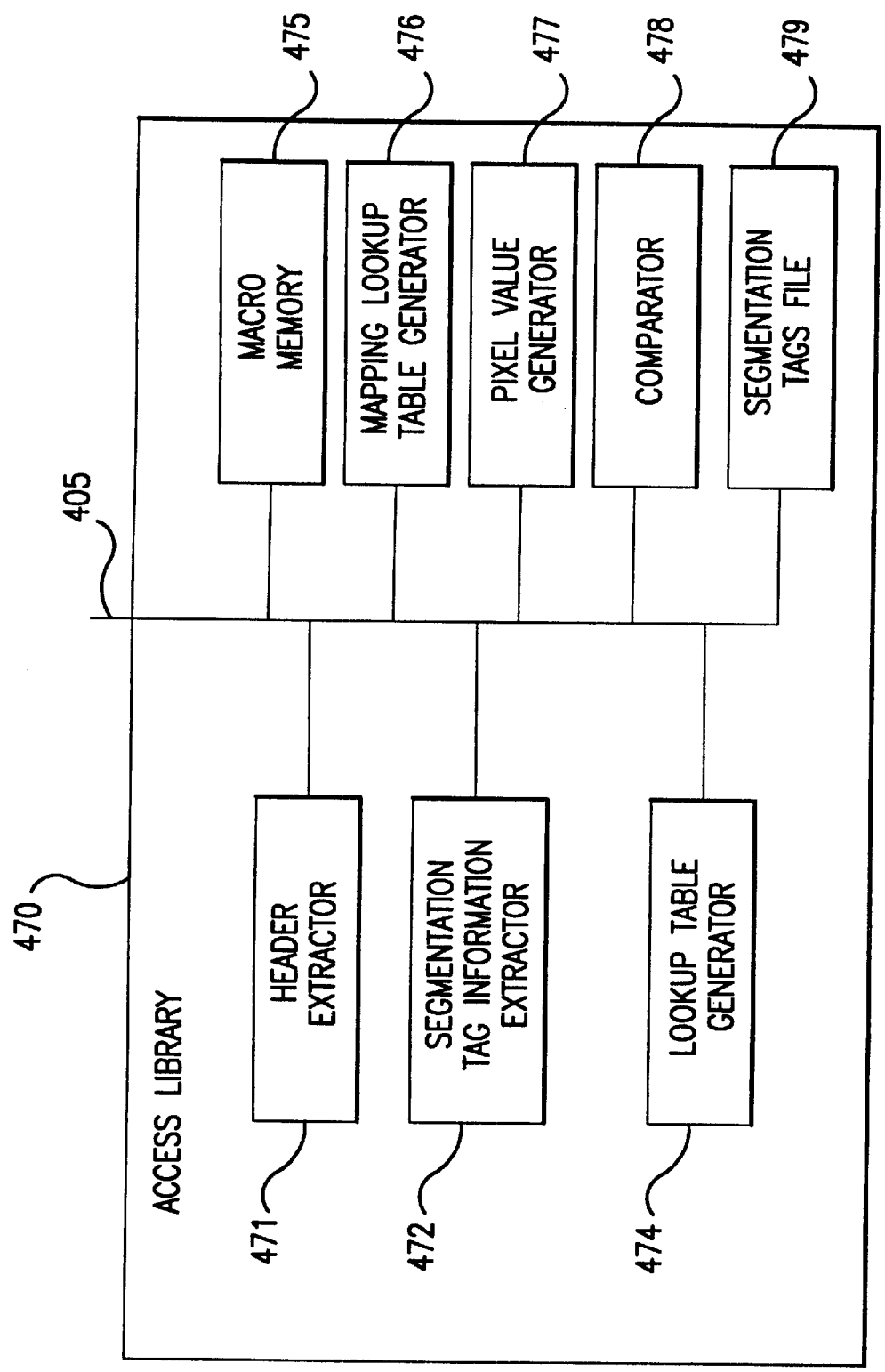
FIG. 7 is a functional block diagram of an access library according to this invention.

The access library 470 is shown in greater detail in FIG. 7. The access library 470 includes a header extractor 471, a segmentation tag information extractor 472, a lookup table generator 474, a macro memory 475, a mapping lookup table generator 476, a pixel value generator 477, a comparator 478 and a segmentation tags memory 479. The header extractor 471 extracts the header information from the segmented image data. The segmentation tag information extractor 472 extracts information about what tags can be present in the segmented image data, and about how these tags are encoded. Based upon this extracted information, the lookup table generator 474 generates a bit descriptor for each allowed tag as described above with respect to FIG. 2. The lookup table generator 474 then generates at least one lookup table using the information obtained by the segmentation tag information extractor 472 and the bit descriptors for each allowed tag.

The macro memory 475 can be a physically separate memory, or can be part of the memory 430. The macro memory 475 stores at least one macro that can be used to access the segmented image information. The mapping lookup table generator 476 creates a map that is used in one method for accessing the segmented image information. The pixel value generator 477 and the comparator 478 are used in another method for accessing the segmented image information. The segmentation tags memory 479 can be a physically separate memory, or can be part of the memory 430. The segmentation tags memory may be, but does not necessarily need to be, used to store information indicating the set of allowed segmentation tags, and/or segmentation tag encoding information showing how the tags are encoded.

In the access library shown in FIG. 7, the header extractor 471 extracts the header information that was associated with the image data in the segmenter 450. The segmentation tag information extractor 472 obtains two necessary pieces of information: 1) information indicating how the segmentation tags are encoded within the image data; and 2) information indicating the set of allowed segmentation tags.

The information indicating how the segmentation tags are encoded is obtained from the header information that is extracted by the header extractor 471, or from an external source such as a separate file. The set of allowed segmentation tags may also be obtained from the header information or, alternatively, may be obtained from the separate segmentation tags memory 479.

The segmentation tags memory 479 is illustrated as being part of the access library 470, but may alternatively be provided in any other suitable form or location. For example, the segmentation tags memory 479 may be stored a file or other data structure in the memory 430 of the digital image processing device 400, or may be provided separately on a magnetic or optical storage disk and accessed using a suitable disk drive.

The lookup table generator 474 generates an integer representation, or bit descriptor, for each of the allowed tags determined by the segmentation tag information extractor 472. The lookup table generator 474 then generates at least one lookup table to be used in accessing the segmentation tags of the image information.

One or more macros are stored in the macro memory 475. Each macro accesses the segmentation tag information using the lookup table generated by the lookup table generator 474 and bit operations that are carried out by the digital image processing device 400 under the control of the controller 420.

The access library 470 may be implemented by a program stored in the memory 430 or provided on a separate storage medium, such as a magnetic or optical disk, and accessed using a suitable access device, such as a magnetic or optical disk drive. Alternatively, the access library 470 may be provided as an ASIC or hardwired circuit installed in the digital image processing device 400.

Although the structure has been described in connection with a digital image processing device 400 when the image file source 500 and the image file sink 600 are peripheral devices, the invention is not limited to this configuration. The image file source 500 and/or the image file sink 600 may be integral parts of the digital image processing device 400.

For example, the digital image processing device 400 may be an integral part of a digital copier (not shown). The digital copier would also include a scanner forming the image file source 500 and an image forming engine forming the image file sink 600. Therefore, the digital copier would function as a stand-alone unit capable of scanning an image, generating digital image data from the image, generating and processing the digital image data, including the segmentation tags, and outputting the processed digital image data to an image transfer device, such as a photosensitive drum or the like, for forming an image on an image carrier, such as a piece of paper (not shown).

It should also be appreciated that many other variations and permutations of the digital image processing device 400 according to this invention are possible. For example, the digital image processing device 400 may be provided on a host computer (not shown) and accessed through a network by remote computer. Alternatively, the image data processor may be part of the image file source 500 or the image file sink 600. Alternatively, one or more of the elements of the digital image processing device 400, such as the segmenter 450 or the access library 470, may be provided or installed either in a host computer and accessed remotely. As another option, one or more of the elements of the digital image processing device 400, such as the segmenter 450 or the access library 470, may be provided in the image file source 500 or image file sink 600. The segmenter 450 and/or the access library 470 could then be accessed before the image file is transferred, when the digital image processing device 400 is integrated in the image file source 500, or after the image is received, when the digital image processing device 400 is integrated in the image file sink 600.

When a mapping-type macro, described in detail below, is to be implemented in accessing the segmented image data, the mapping lookup table generator 476 generates a second lookup table, or a second set of lookup tables, based upon a specified integer value or values input by the user or users. The pixel value generator 477 generates an integer value for each pixel as specified by the user or users.

When a matching-type macro is to be used in accessing the segmented image data, the comparator 478 and the pixel value generator 477 are used. In this case, the pixel value generator 477 generates an integer value for each pixel, and the comparator 478 compares the generated integer value for each pixel with specified ones of the descriptors returned for each tag.

Figure 8:
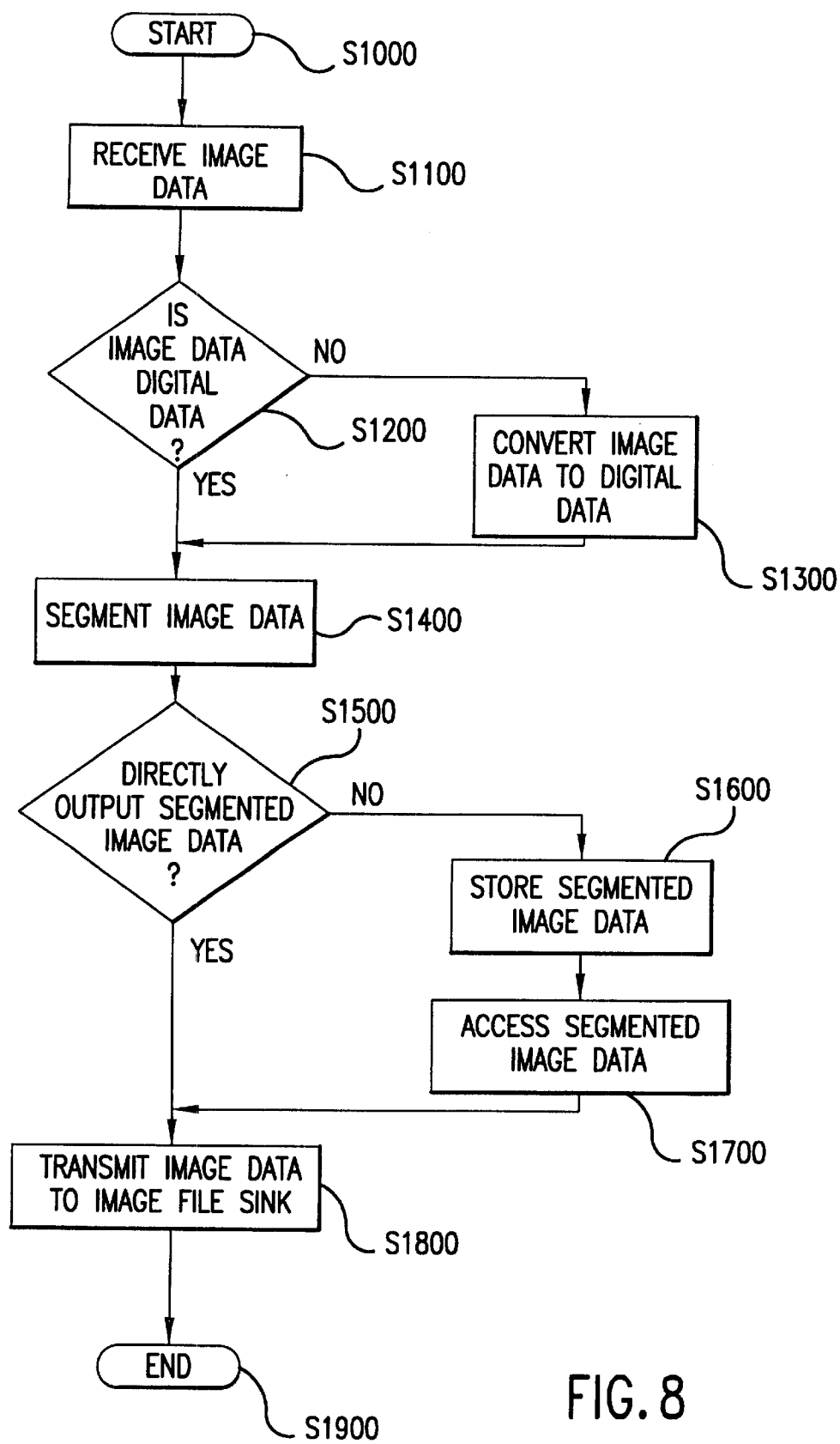
FIG. 8 is a flowchart outlining one method for image processing according to this invention.

FIG. 8 is a flowchart outlining how digital image information is processed according to one embodiment of the invention. The control procedure begins in step S1000 and continues to step S1100. In step 1100, image data is received or input from an image source. Next, in step S1200, the control procedure determines whether the input image data is digital data. If the input image data is not digital data, control continues to step S1300. Otherwise, control jumps directly to step S1400.

In step S1300, the image data is converted to digital data. Control then continues to step S1400. In step S1400, the image data is segmented. Control then continues to step S1500.

In step S1500, the control procedure determines whether the segmented image data is to be directly output. If the segmented data is not to be directly output, control continues to step S1600. Otherwise, control jumps directly to step S1800. In step S1600, the segmented image data is stored for an indefinite period. Then, in step S1700, after the indefinite period, the segmented image data is accessed. Next, in step S1800, the accessed image data is output to an image file sink. Finally, in step S1900, the control procedure ends.

Figure 9:
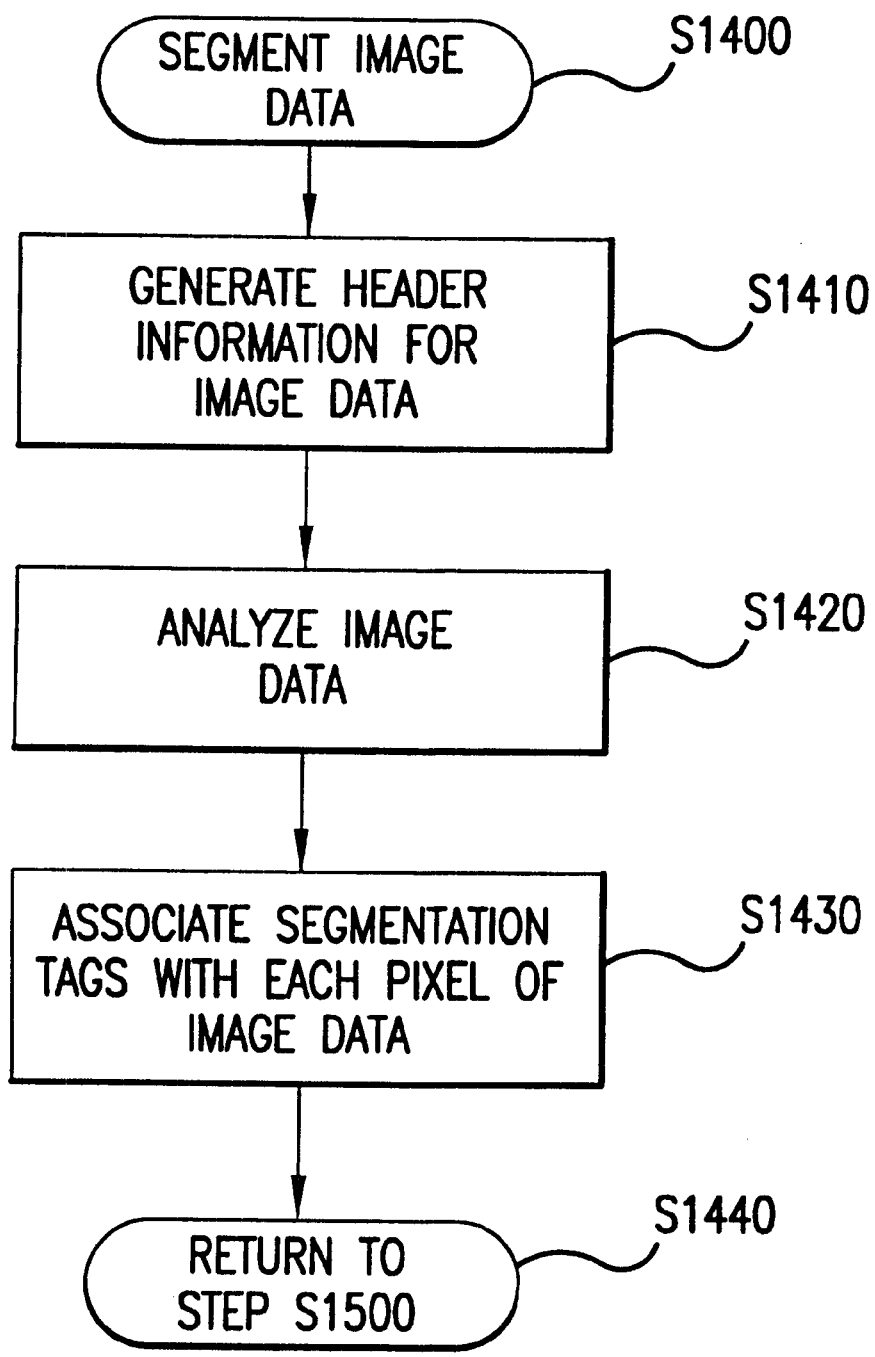
FIG. 9 is a flowchart outlining a segmenting process.

FIG. 9 is a flowchart outlining in greater detail the image data segmenting process of step S1400. Beginning in step S1400, the control procedure continues to step S1410, where a header is generated that contains general information relating to the digital image data. This header is associated with the digital image data. Then, in step S1420, each pixel of the image data is analyzed. Next, in step S1430, one or more segmentation tags are associated with each pixel of the image data. Finally, in step SI 440, control returns to step S1500.

Figure 10:
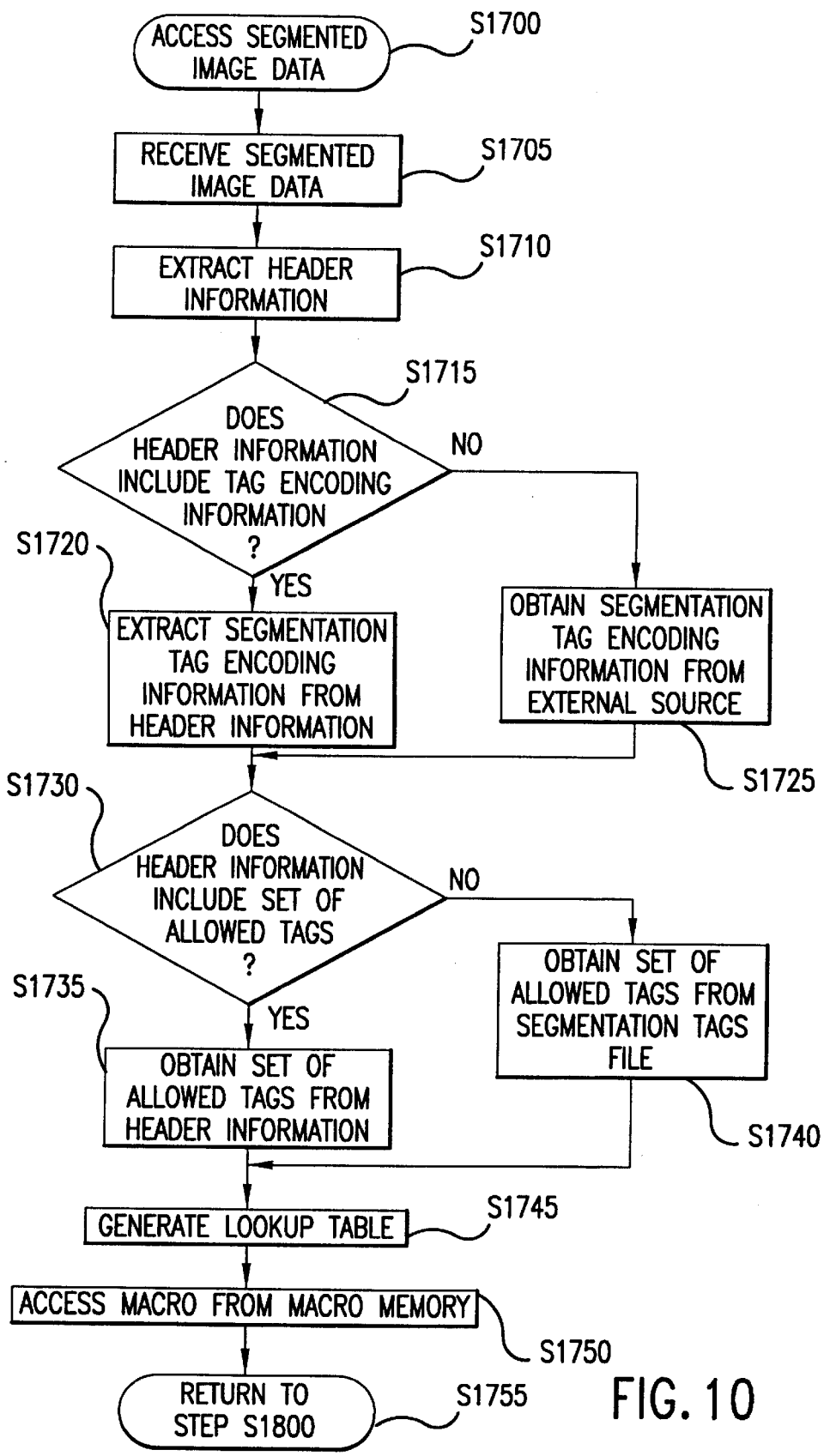
FIG. 10 is a flowchart outlining the process of accessing segmented image data according to this invention.

FIG. 10 is a flowchart outlining in greater detail the accessing process of step S1700. Beginning in step S1700, the control procedure continues to step S1705, where the segmented image data is received. Next, in step S1710, the header information for the image data is extracted from the received image data. Control then continues to step S1715.

In step S1715, the control procedure determines whether the extracted header information includes tag encoding information indicating how the segmentation tags are encoded. If the header information includes tag encoding information, control continues to step S1720. Otherwise, control jumps to step S1725.

In step S1720, the tag encoding information is extracted from the header information. Control then jumps to step S1730. In step S1725, the tag encoding information is obtained from an external source, meaning a source separate from the image header, such as a separate file. Control then continues to step SI 730.

In step S1730, the control procedure determines whether the extracted header information includes the set of allowed segmentation tags. If the header information includes the set of allowed tags, control continues to step S1735. Otherwise, control jumps to step S1740.

In step S1735, the set of allowed tags is obtained from the header information. Control then jumps to step S1745. In step S1740, the set of allowed tags is obtained from a segmentation tags file, which may be associated with or be a part of the external source described above in connection with step S1725. Control then continues to step S1745.

In step S1745, a lookup table is generated. Next, in step S1750, an access macro is accessed, typically for each pixel. The access macro accesses the segmented image information using the lookup table generated in step S1745 and bit operations. Finally, in step S1755, control returns to step S1800.

The access library defines macros for testing whether a given pixel has only a specified tag set, and/or for testing whether a sample of pixels has at least the specified tag set. For example, to test whether only the TRC.TRC1 tag is set for a given pixel, an equality test of the appropriate bit descriptor is performed using the appropriate table lookup entry, such as by the following code:

bit_desc_tcr1=4096;

is_trc1=(lookup[sample]==bit_desc_tcr1).

To test whether a given sample of pixels has at least the TRC.TRC1 tag set, a masking technique may be used. Masking allows the user to "open a window" on the desired information while suppressing, or "masking out," the undesired information. Masking requires an AND operation. Specifically, in this case, the following code may be used to AND the appropriate mask to the table lookup entry and then test the equality:

bit_desc_tcr1=4096;

atleast_tcr1=((lookup[sample]&mask)==bit_desc_trc1).

"Mask" is a bitwise mask localizing each tag family within the bit descriptor. In this example, "mask" has the value 7<<12=28672 (i.e., $7 \times 2^{12}$=28672).

It should be appreciated that this masking technique is separate and distinct from the bit masks that are part of the bit operations used in generating the lookup tables described earlier. This masking technique is used in some, but not all, embodiments of this invention.

In many cases, an application is interested in only a specific set of tags. A mechanism called "mappings" allows a developer to input a list of tags that are of interest to the application and request that the tags be mapped to specific integer values to simplify the application code. During initialization of the access library, the developer provides a map string which associates integer values with specific tags. For example, the map string:

"0: Function.Text+Color.Black/n1 :Function.Text+Color.XeroxRed", indicates that if a pixel has a tag identifying it as "Black Text", the library should return a value of "0", and if a pixel has a tag identifying it as "XeroxRed Text", a value of"1" should be returned. These values of "0" and "1" are map values.

A map includes of a list of map elements. Each map element includes a tag name and a map value. In mapping, a second lookup table, or map lookup table, is generated by the access library. This is accomplished by 1) determining a tag map bit descriptor (i.e., 4096 in the case of the TRC1 tag shown in FIG. 4) for each tag that the user desires to map, 2) checking all elements of a bit descriptor table (i.e., as represented in FIG. 4) to see whether they match the tag map bit descriptor, and 3) placing the appropriate map value in the map lookup table. The library may, for example, first look for exact matches, and then take partial matches if no exact matches occur.

The access library provides a macro that efficiently maps a pixel sample to the appropriate map value. This macro returns the value stored in the second lookup table, which is the map's lookup table. A "−1" value, for example, may be used to indicate that no map element corresponded to the pixel sample's value.

It should also be appreciated that the mapping may be dynamically changeable. For example, multiple users may input multiple map strings, and the multiple map strings may be used at the same time.

A sample code for implementing a mapping process is given below. In this example, the map string described above is used to define a map to look for "Black Text" or "XeroxRed Text" tags.

```
Instance *ins = XTSource (0,file);
HEADER *hdr = XTHeader (ins);
OmegaTags *omega;
char *map;
int nchan, chan;
/* define a map to look for Black Text or XeroxRed Text tags */
map = "0: Function.Text+Color.Black\n1:
Function.Text+Color.XeroxRed";
/* read the tags from the header */
omega = getheadertags (hdr,map);
/* which omega channel is the segmentation tags channel */
nchan = getomegatagparts(omega, NULL, 0, chan);
/* for each scanline */
for (j=0; j<lin; ++j)
  {
  /* point to beginning of omega channel scanline buffer */
  uchar *o = scanline_buffer[chan];
  /* for each pixel */
  for (i=0; i<pix; ++i, ++o)
    {
    /* get the tag map value */
    text_tag = tagMap(omega, chan, *o);
    /* check if tag is valid */
    if (text_tag == −1)
      continue;
    /* is it Black Text */
    else if (text_tag ==0)
      do_black_text( );
    /* is it XeroxRed Text */
    else if (text_tag == 1)
      do_red_text ( );
    }
  }
```

Using this example, the tag map macro returns a map value of "0" for a pixel that is tagged as "Function.Text" and also as "Color.Black", while a pixel that is tagged as "Function.Text" and also as "Color.XeroxRed" returns a map value of "1". All other tags return a map value of "−1".

The map string used in this example is user-specified. If no map string is specified by the user, a default mapping is entered.

Another way of using the access library to achieve the same results is to use procedures that determine exact matches or partial matches. In codes such as the sample code shown below, these procedures are called, for example, as "tagMatchExact( )" and "tagMatchPartial( )". Specifically, using the code shown below, a specific descriptor is returned for each named tag using the procedure "tagNameToDescription( )". A bit value is returned for each pixel sample using the procedure "tagID( )". The procedure "tagMatchPartial( )" then compares the returned bit value to the descriptor.

```
Instance *ins = XTSource (0,file);
HEADER *hdr = XTHeader (ins);
OmegaTags *omega;
int nchan, chan;
TagDescription black_text_desc;
TagDescription red_text_desc;
int tag_id;
/* read the tags from the header */
omega = getheadertags (hdr,NULL);
/* get the bit descriptors for the required tags */
black_desc = tagNameToDescription(omega,
"Function.Text+Color.Black");
red_desc = tagNameToDescription(omega,
"Function.Text+Color.XeroxRed");
/* which omega channel is the segmentation tags channel */
nchan = getomegatagparts(omega, NULL, 0, chan);
/* for each scanline */
for (j=0; j<lin; ++j)
  {
  /* point to beginning of omega channel scanline buffer */
  uchar *o = scanline_buffer[chan];
  /* for each pixel */
  for (i=0; i<pix; ++i, ++o)
    {
    /* get the tag ID value, the 32-bit descriptor */
    tag_id = tagID(omega, chan, *o);
    /* is it black text */
    if ((tagMatchPartial(black_desc,tag_id)) == 0)
      do_black_text( );
    /* is it XeroxRed text*/
    else if((tagMatchPartial(red_desc,tag_id)) == 0)
      do_red_text( );
    }
  }
```

Obviously, the "tagMatchExact" procedure could be used in a similar manner.

As can be seen from the above description and code samples, tag information can be accessed using relatively brief and simple codes. Moreover, the tag information can be accessed very quickly, especially when using a mapping technique such as the one described above. In both the mapping technique, and the exact match and partial match techniques, lookup tables and bit operations make it possible to examine tag information for every pixel without requiring procedure calls for each pixel.

Although specific code samples have been given, it is obvious that many equivalents in many programming languages are possible. Furthermore, it is obvious that the number of tags and tag families may be any desired number.

The digital image processing device 400 is preferably implemented on a programmed general purpose computer. However, the digital image processing device 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 7–9, can be used to implement the digital image processing device 400.

Similarly, the access library 470 can be implemented on a special purpose computer, a programmed microprocessor microcontroller and peripheral integrated circuit elements, an ASIC or other integrated circuit, a digital signal processor, a hardwired electronic or logic circuit, such as a discrete element circuit, a programmable logic device such as a PLD, PLA, FPGA or Pal, or the like. The access library 470 can also be implemented by suitably programming general purpose computer, a special purpose computer, or a programmed microprocessor or microcontroller and peripheral integrated circuit elements.

While the invention has been described in conjunction with the specific embodiments described above, many equivalent alternatives, modifications and variations will become apparent to those skilled in the art once given this disclosure. Accordingly, the preferred embodiments of the invention as set forth above are considered to be illustrative and not limiting. Various changes to the described embodiments may be made without departing from the spirit and scope of the invention.

What is claimed is:

1. A method for accessing tag information of image data of an image, the image comprising a plurality of pixels, the image segmented into a plurality of segments, each segment associated with different segmentation tag information, the method comprising:

obtaining first information indicating how the segmentation tags have been encoded;

obtaining second information indicating a set of allowed segmentation tags;

creating a lookup table based on the first and second information; and accessing the tag information for at least one of the plurality of segments using the lookup table and at least one bit operation.

2. The method as set forth in claim 1, wherein the at least one bit operation comprises a plurality of bit operations.

3. The method as set forth in claim 2, wherein at least one of the first and second information is obtained from one of header information associated with the image and an external source.

4. The method as set forth in claim 2, wherein the tag information includes specific tags from at least two tag families.

5. The method as set forth in claim 4, wherein at least one tag is associated with each pixel.

6. The method as set forth in claim 5, wherein tags from more than one tag family are associated with each pixel, and at most one tag from each family is associated with each pixel.

7. The method as set forth in claim 6, wherein each tag family includes a "NO TAG" tag.

8. The method as set forth in claim 2, wherein accessing the tag information further comprises:

providing a map comprising a plurality of map elements, each map element comprising an integer value and at least one tag name;

creating a second lookup table based on at least one user-specified value input as part of a map string; and returning a value for each pixel based on the second lookup table.

9. The method as set forth in claim 2, wherein accessing the tag information further comprises:

specifying at least one segmentation tag from among the allowed segmentation tags;

returning a specific descriptor for the specified segmentation tag;

returning a specific value for each pixel;

comparing the returned specific value to the specific descriptor; and determines whether the returned specific value is one of an exact match and a partial match of the specific descriptor.

10. A data carrier carrying data for implementing an access library that:

obtains information indicating a set of allowed segmentation tags of a segmented image;

obtains information indicating how the segmentation tags have been encoded within the segmented image; and initializes at least one table lookup based on the information indicating the set of allowed tags and the information indicating how tags have been encoded.

11. The data carrier as set forth in claim 10, wherein the access library further:

defines at least one tag information-accessing macro that provides access to tag information by performing table lookups and bit operations.

12. The data carrier as set forth in claim 11, wherein the least one macro is a mapping macro that associates integer values with specific ones of the segmentation tags and maps each pixel to an appropriate one of the integer values.

13. The data carrier as set forth in claim 12, wherein the mapping macro associates integer values with specific ones of the segmentation tags in accordance with at least one map string.

14. The data carrier as set forth in claim 13, wherein the at least one map string is a user-specified map string.

15. The data carrier as set forth in claim 13, wherein the at least one map string is a default map string.

16. The data carrier as set forth in claim 11, wherein the least one macro is a macro that, when a user specifies at least one specific segmentation tag from among the allowed segmentation tags:

returns a specific descriptor for the at least one specified segmentation tag;

returns a specific value for each pixel;

compares the returned specific value to the specific descriptor; and determines whether the returned specific value is one of an exact match and a partial match of the specific descriptor.

17. A computer including the data carrier of claim 11, comprising a communications interface through which a user can indicate that certain tag information is desired, wherein, in response to the indication by the user through the communications interface, the computer accesses the certain tag information by implementing the at least one tag information-accessing macro.

18. A digital image processing system, comprising:

a segmenter that segments an image by analyzing received image data, associating at least one segmentation tag with each pixel of the image data, generating and associating header information with the received image data, the header information including at least information indicating how the segmentation tags are encoded, and storing the image data along with the segmentation tags and header information;

apparatus capable of performing at least one bit operation;

an access library that obtains information indicating a set of allowed segmentation tags, obtains information indicating how the segmentation tags are encoded, and creates a first lookup table based on the information indicating the set of allowed segmentation tags and the information indicating how the segmentation tags are encoded; and an accessor that accesses at least a portion of the segmentation tag information using the first lookup table and the at least one bit operation and processes the image data in accordance with the accessed tag information.

19. The digital image processing system as set forth in claim 18, wherein the at least one bit operation comprises a plurality of bit operations.

20. The digital image processing system as set forth in claim 19, further comprising a scanner that scans an image and generates image data corresponding to the image.

21. The digital image processing system as set forth in claim 19, further comprising an image forming device to which the processed data is output.

22. The digital image processing system as set forth in claim 21, wherein the image forming device is one of a printer, a facsimile machine, a digital copier memory, a CRT or LCD display, a host computer, and a remotely located computer.

* * * * *